(12) United States Patent
Nathan et al.

(10) Patent No.: US 7,992,178 B1
(45) Date of Patent: Aug. 2, 2011

(54) DOWNLOADING FILE RECEPTION PROCESS

(75) Inventors: Guy Nathan, Nun'Island (CA); Ken Phillips, Montreal (CA); Dominique Dion, Laval (CA); Mounir Khenfir, Montreal (CA)

(73) Assignee: TouchTunes Music Corporation, New York, NY (US)

( * ) Notice: Subject to any disclaimer, the term of this patent is extended or adjusted under 35 U.S.C. 154(b) by 1026 days.

(21) Appl. No.: 09/583,863

(22) Filed: Jun. 1, 2000

(30) Foreign Application Priority Data

Feb. 16, 2000 (FR) ...................................... 00 01907

(51) Int. Cl.
*H04N 7/173* (2006.01)
(52) U.S. Cl. ............... 725/93; 725/50; 725/89; 709/221
(58) Field of Classification Search .................. 725/134, 725/50, 86–119; 707/102, 204; 709/219–222, 709/231
See application file for complete search history.

(56) References Cited

U.S. PATENT DOCUMENTS

| | | | |
|---|---|---|---|
| 3,807,541 A | 4/1974 | Kortenhaus | |
| 3,982,620 A | 9/1976 | Kotenhaus | |
| 4,008,369 A | 2/1977 | Theurer et al. | |
| 4,186,438 A | 1/1980 | Benson | |
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |
| 4,369,442 A | 1/1983 | Werth et al. | |
| 4,375,287 A | 3/1983 | Smith | |
| 4,412,292 A | 10/1983 | Sedam | |
| 4,413,260 A | 11/1983 | Siegel et al. | |
| 4,521,014 A | 6/1985 | Sitrick | |
| 4,528,643 A | 7/1985 | Freeny | |
| 4,558,413 A | 12/1985 | Schmidt | |
| 4,572,509 A | 2/1986 | Sitrick | |
| 4,577,333 A | 3/1986 | Lewis et al. | |
| 4,582,324 A | 4/1986 | Koza | |

(Continued)

FOREIGN PATENT DOCUMENTS

AU          199954012        4/2000

(Continued)

OTHER PUBLICATIONS

Bonczck, Robert H. et al, "The DSS Development System", 1983 National Computer Conference, Anaheim, California, May 16-19, 1983, pp. 441-455.

(Continued)

*Primary Examiner* — Annan Q Shang
(74) *Attorney, Agent, or Firm* — Nixon & Vanderhye PC (57) ABSTRACT

Process for receiving files sent by a central server to an audiovisual data reproduction system, managed by an operating system and linked to the server, by means of a data transfer link, characterised in that the process comprises:
    a step consisting of initialising a link between the central server and an audiovisual data reproduction system,
    a step consisting of storing files sent by the central server on storage means of the audiovisual data reproduction system, each file comprising specified information representative of the type of data contained in the file,
    a step consisting of searching, for each file received, a specific reception function, this search step being carried out by means of the specified information representative of the type of data contained in the file,
    a step consisting of processing each file by the corresponding reception function, the processing comprising copying of the file received to a specified storage area.

5 Claims, 3 Drawing Sheets

U.S. PATENT DOCUMENTS

| | | | |
|---|---|---|---|
| 4,588,187 A | 5/1986 | Dell | |
| 4,593,904 A | 6/1986 | Graves | |
| 4,597,058 A | 6/1986 | Izumi | |
| 4,636,951 A | 1/1987 | Harlick | |
| 4,652,998 A | 3/1987 | Koza | |
| 4,654,799 A | 3/1987 | Ogaki | |
| 4,658,093 A | 4/1987 | Hellman | |
| 4,667,802 A | 5/1987 | Verduin | |
| 4,674,055 A | 6/1987 | Ogaki et al. | |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,704,725 A * | 11/1987 | Harvey et al. | 380/242 |
| 4,704,804 A | 11/1987 | Leal | |
| 4,707,804 A | 11/1987 | Leal | |
| 4,722,053 A | 1/1988 | Dubno | |
| 4,761,684 A | 8/1988 | Clark | |
| 4,766,581 A | 8/1988 | Korn | |
| 4,787,050 A | 11/1988 | Suzuki | |
| 4,792,849 A | 12/1988 | McCalley | |
| 4,807,052 A | 2/1989 | Amano | |
| 4,811,325 A | 3/1989 | Sharples | |
| 4,814,972 A | 3/1989 | Winter et al. | |
| 4,825,054 A | 4/1989 | Rust | |
| 4,829,570 A | 5/1989 | Schotz | |
| 4,852,154 A | 7/1989 | Lewis et al. | |
| 4,857,714 A | 8/1989 | Sunyich | |
| 4,868,832 A | 9/1989 | Marrington | |
| 4,885,694 A | 12/1989 | Pray et al. | |
| 4,905,279 A | 2/1990 | Nishio | |
| 4,920,432 A | 4/1990 | Eggers | |
| 4,922,420 A | 5/1990 | Nakagawa | |
| 4,924,378 A | 5/1990 | Hershey | |
| 4,926,485 A | 5/1990 | Yamashita | |
| 4,937,807 A | 6/1990 | Weitz | |
| 4,949,187 A | 8/1990 | Cohen | |
| 4,953,159 A | 8/1990 | Hayden et al. | |
| 4,956,768 A | 9/1990 | Sidi | |
| 4,958,835 A | 9/1990 | Tashiro | |
| 4,977,593 A | 12/1990 | Ballance | |
| 4,999,806 A | 3/1991 | Chernow | |
| 5,008,814 A | 4/1991 | Mathur | |
| 5,012,121 A | 4/1991 | Hammond | |
| 5,027,426 A | 6/1991 | Chiocca | |
| 5,041,921 A | 8/1991 | Scheffler | |
| 5,046,093 A | 9/1991 | Wachob | |
| 5,053,758 A | 10/1991 | Cornett et al. | |
| 5,058,089 A | 10/1991 | Yoshimaru | |
| 5,077,607 A | 12/1991 | Johnson et al. | |
| 5,081,534 A | 1/1992 | Geiger et al. | |
| 5,101,499 A | 3/1992 | Streck et al. | |
| 5,106,097 A | 4/1992 | Levine | |
| 5,117,407 A | 5/1992 | Vogel | |
| 5,138,712 A | 8/1992 | Corbin | |
| 5,148,159 A | 9/1992 | Clark et al. | |
| 5,155,847 A | 10/1992 | Kirouac | |
| 5,159,678 A * | 10/1992 | Wengelski et al. | 711/153 |
| 5,163,131 A | 11/1992 | Row | |
| 5,166,886 A | 11/1992 | Molnar | |
| 5,172,413 A | 12/1992 | Bradley et al. | |
| 5,180,309 A | 1/1993 | Egnor | |
| 5,189,630 A * | 2/1993 | Barstow et al. | 709/246 |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,210,854 A | 5/1993 | Beaverton et al. | |
| 5,214,761 A | 5/1993 | Barrett et al. | |
| 5,222,134 A | 6/1993 | Waite et al. | |
| 5,228,015 A | 7/1993 | Arbiter et al. | |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,261,104 A | 11/1993 | Bertram et al. | |
| 5,262,875 A | 11/1993 | Mincer et al. | |
| 5,276,866 A | 1/1994 | Paolini | |
| 5,278,904 A | 1/1994 | Servi | |
| 5,282,028 A | 1/1994 | Johnson et al. | |
| 5,289,476 A | 2/1994 | Johnson et al. | |
| 5,289,546 A | 2/1994 | Hetherington | |
| 5,315,161 A | 5/1994 | Robinson | |
| 5,315,711 A | 5/1994 | Barone et al. | |
| 5,319,455 A | 6/1994 | Hoarty et al. | |
| 5,321,846 A | 6/1994 | Yokota et al. | |
| 5,327,230 A | 7/1994 | Dockery | |
| 5,339,095 A | 8/1994 | Redford | |
| 5,339,413 A | 8/1994 | Koval | |
| 5,341,350 A | 8/1994 | Frank | |
| 5,355,302 A | 10/1994 | Martin | |
| 5,357,276 A | 10/1994 | Banker | |
| 5,369,778 A | 11/1994 | SanSoucie | |
| 5,375,206 A | 12/1994 | Hunter | |
| 5,386,251 A | 1/1995 | Movshovich | |
| 5,389,950 A | 2/1995 | Martin et al. | |
| 5,404,505 A | 4/1995 | Levinson | |
| 5,406,634 A | 4/1995 | Anderson et al. | |
| 5,408,417 A | 4/1995 | Wilder | |
| 5,410,326 A | 4/1995 | Goldstein | |
| 5,410,703 A | 4/1995 | Nilsson et al. | |
| 5,418,713 A | 5/1995 | Allen | |
| 5,420,923 A | 5/1995 | Beyers | |
| 5,428,252 A | 6/1995 | Walker | |
| 5,428,606 A | 6/1995 | Moskowitz | |
| 5,431,492 A | 7/1995 | Rothschild | |
| 5,440,632 A | 8/1995 | Bacon et al. | |
| 5,444,499 A | 8/1995 | Saitoh | |
| 5,445,295 A | 8/1995 | Brown | |
| 5,455,619 A | 10/1995 | Truckenmiller et al. | |
| 5,455,926 A | 10/1995 | Keele | |
| 5,457,305 A | 10/1995 | Akel | |
| 5,465,213 A | 11/1995 | Ross | |
| 5,467,326 A | 11/1995 | Miyashita et al. | |
| 5,469,370 A | 11/1995 | Ostrover et al. | |
| 5,469,573 A | 11/1995 | McGill et al. | |
| 5,471,576 A | 11/1995 | Yee | |
| 5,475,835 A | 12/1995 | Hickey | |
| 5,481,509 A | 1/1996 | Knowles | |
| 5,487,167 A | 1/1996 | Dinallo et al. | |
| 5,489,103 A | 2/1996 | Okamoto | |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,515,173 A | 5/1996 | Mankovitz et al. | |
| 5,519,435 A | 5/1996 | Anderson | |
| 5,519,457 A | 5/1996 | Nishigaki et al. | |
| 5,521,631 A | 5/1996 | Budow et al. | |
| 5,521,918 A | 5/1996 | Kim | |
| 5,521,922 A | 5/1996 | Fujinami et al. | |
| 5,523,781 A | 6/1996 | Brusaw | |
| 5,528,732 A | 6/1996 | Klotz | |
| 5,532,734 A | 7/1996 | Goertz | |
| 5,546,039 A | 8/1996 | Hewitt et al. | |
| 5,548,729 A | 8/1996 | Akiyoshi | |
| 5,550,577 A | 8/1996 | Verbiest | |
| 5,554,968 A | 9/1996 | Lee | |
| 5,555,244 A | 9/1996 | Gupta | |
| 5,557,541 A | 9/1996 | Schulhof | |
| 5,557,724 A | 9/1996 | Sampat et al. | |
| 5,559,505 A | 9/1996 | McNair | |
| 5,559,549 A | 9/1996 | Hendricks | |
| 5,561,709 A | 10/1996 | Remillard | |
| 5,565,908 A | 10/1996 | Ahmad | |
| 5,566,237 A | 10/1996 | Dobbs | |
| 5,570,363 A | 10/1996 | Holm | |
| 5,578,999 A | 11/1996 | Matsuzawa et al. | |
| 5,579,404 A | 11/1996 | Fielder et al. | |
| 5,583,561 A | 12/1996 | Baker et al. | |
| 5,583,937 A | 12/1996 | Ullrich et al. | |
| 5,583,994 A | 12/1996 | Rangan | |
| 5,583,995 A | 12/1996 | Gardner et al. | |

| | | | | | | |
|---|---|---|---|---|---|---|
| 5,592,482 A | 1/1997 | Abraham | | 5,831,663 A | 11/1998 | Waterhouse et al. |
| 5,592,551 A | 1/1997 | Lett | | 5,832,024 A | 11/1998 | Schotz et al. |
| 5,592,611 A | 1/1997 | Midgely et al. | | 5,832,287 A | 11/1998 | Atalla |
| 5,594,509 A | 1/1997 | Florin | | 5,835,843 A | 11/1998 | Haddad |
| 5,596,702 A | 1/1997 | Stucka et al. | | 5,842,869 A | 12/1998 | McGregor et al. |
| 5,612,581 A | 3/1997 | Kageyama | | 5,845,104 A | 12/1998 | Rao |
| 5,613,909 A | 3/1997 | Stelovsky | | 5,845,256 A | 12/1998 | Pescitelli et al. |
| 5,616,876 A | 4/1997 | Cluts | | 5,848,398 A | 12/1998 | Martin |
| 5,617,565 A | 4/1997 | Augenbraun et al. | | 5,851,149 A | 12/1998 | Xidos et al. |
| 5,619,247 A | 4/1997 | Russo | | 5,854,887 A | 12/1998 | Kindell |
| 5,619,249 A | 4/1997 | Billock et al. | | 5,857,020 A | 1/1999 | Peterson |
| 5,619,250 A | 4/1997 | McClellan et al. | | 5,857,707 A | 1/1999 | Devlin |
| 5,619,698 A | 4/1997 | Lillich | | 5,862,324 A | 1/1999 | Collins |
| 5,623,666 A | 4/1997 | Pike | | 5,864,811 A | 1/1999 | Tran et al. |
| 5,631,693 A | 5/1997 | Wunderlich et al. | | 5,864,868 A | 1/1999 | Contois |
| 5,636,276 A | 6/1997 | Brugger | | 5,864,870 A | 1/1999 | Guck |
| 5,638,426 A | 6/1997 | Lewis | | 5,867,714 A | 2/1999 | Todd |
| 5,642,337 A | 6/1997 | Oskay | | 5,870,721 A | 2/1999 | Norris |
| 5,644,714 A | 7/1997 | Kikinis | | 5,880,386 A * | 3/1999 | Wachi et al. .................... 84/601 |
| 5,644,766 A | 7/1997 | Coy | | 5,880,769 A | 3/1999 | Nemirofsky et al. |
| 5,654,714 A | 8/1997 | Takahashi et al. | | 5,884,028 A | 3/1999 | Kindell |
| 5,659,466 A | 8/1997 | Norris et al. | | 5,884,298 A | 3/1999 | Smith |
| 5,661,517 A | 8/1997 | Budow et al. | | 5,887,193 A | 3/1999 | Takahashi |
| 5,661,802 A | 8/1997 | Nilssen | | 5,893,162 A * | 4/1999 | Lau et al. ...................... 711/153 |
| 5,663,756 A | 9/1997 | Blahut et al. | | 5,896,094 A | 4/1999 | Narisada et al. |
| 5,668,592 A | 9/1997 | Spaulding | | 5,903,266 A | 5/1999 | Berstis et al. |
| 5,668,778 A | 9/1997 | Quazi | | 5,913,040 A | 6/1999 | Rakavy |
| 5,668,788 A | 9/1997 | Allison | | 5,914,712 A | 6/1999 | Sartain et al. |
| 5,675,734 A | 10/1997 | Hair | | 5,915,094 A | 6/1999 | Kouloheris |
| 5,680,533 A | 10/1997 | Yamato et al. | | 5,915,238 A | 6/1999 | Tjaden |
| 5,684,716 A | 11/1997 | Freeman | | 5,917,537 A | 6/1999 | Lightfoot |
| 5,689,641 A | 11/1997 | Ludwig et al. | | 5,917,835 A | 6/1999 | Barrett |
| 5,691,778 A | 11/1997 | Song | | 5,918,213 A | 6/1999 | Bernard et al. |
| 5,691,964 A | 11/1997 | Niederlein et al. | | 5,920,700 A | 7/1999 | Gordon et al. |
| 5,696,914 A | 12/1997 | Nahaboo et al. | | 5,920,702 A | 7/1999 | Johnson |
| 5,697,844 A | 12/1997 | Von Kohorn | | 5,923,885 A | 7/1999 | Johnson |
| 5,703,795 A | 12/1997 | Mankovitz | | 5,926,531 A | 7/1999 | Petite |
| 5,708,811 A | 1/1998 | Arendt | | 5,930,765 A | 7/1999 | Martin |
| 5,712,976 A | 1/1998 | Falcon | | 5,931,908 A | 8/1999 | Gerba |
| 5,713,024 A | 1/1998 | Halladay | | 5,933,090 A | 8/1999 | Christenson |
| 5,715,416 A | 2/1998 | Baker | | 5,940,504 A | 8/1999 | Griswold |
| 5,717,452 A | 2/1998 | Janin et al. | | 5,949,411 A | 9/1999 | Doerr et al. |
| 5,721,583 A | 2/1998 | Harada et al. | | 5,949,688 A | 9/1999 | Montoya |
| 5,721,815 A | 2/1998 | Ottesen et al. | | 5,953,429 A | 9/1999 | Wakai et al. |
| 5,721,829 A | 2/1998 | Dunn et al. | | 5,956,716 A * | 9/1999 | Kenner et al. ................... 707/10 |
| 5,724,525 A | 3/1998 | Beyers et al. | | 5,959,869 A | 9/1999 | Miller |
| 5,726,909 A | 3/1998 | Krikorian | | 5,959,945 A | 9/1999 | Kleiman |
| 5,734,719 A | 3/1998 | Tsevdos | | 5,963,916 A | 10/1999 | Kaplan |
| 5,734,961 A | 3/1998 | Castille | | 5,966,495 A | 10/1999 | Takahashi |
| 5,739,451 A | 4/1998 | Winksy et al. | | 5,978,855 A | 11/1999 | Metz |
| 5,743,745 A | 4/1998 | Reintjes | | 5,978,912 A | 11/1999 | Rakavy et al. |
| 5,745,391 A | 4/1998 | Topor | | 5,980,261 A | 11/1999 | Mino et al. |
| 5,748,254 A | 5/1998 | Harrison et al. | | 5,999,499 A | 12/1999 | Pines et al. |
| 5,748,468 A | 5/1998 | Notenboom et al. | | 5,999,624 A | 12/1999 | Hopkins |
| 5,751,336 A | 5/1998 | Aggarwal et al. | | 6,002,720 A | 12/1999 | Yurt |
| 5,757,936 A | 5/1998 | Lee | | 6,005,599 A | 12/1999 | Asai et al. |
| 5,758,340 A | 5/1998 | Nail | | 6,008,735 A | 12/1999 | Chiloyan et al. |
| 5,761,655 A | 6/1998 | Hoffman | | 6,009,274 A | 12/1999 | Fletcher |
| 5,762,552 A | 6/1998 | Vuong | | 6,011,758 A | 1/2000 | Dockes et al. |
| 5,774,527 A | 6/1998 | Handelman et al. | | 6,018,337 A | 1/2000 | Peters |
| 5,774,668 A | 6/1998 | Choquier | | 6,018,726 A | 1/2000 | Tsumura |
| 5,774,672 A | 6/1998 | Funahashi | | 6,025,868 A | 2/2000 | Russo |
| 5,781,889 A | 7/1998 | Martin | | 6,034,925 A | 3/2000 | Wehmeyer |
| 5,786,784 A | 7/1998 | Gaudichon | | 6,038,591 A | 3/2000 | Wolfe et al. |
| 5,790,172 A | 8/1998 | Imanaka | | 6,040,829 A | 3/2000 | Croy et al. |
| 5,790,671 A | 8/1998 | Cooper | | 6,041,354 A | 3/2000 | Biliris et al. |
| 5,790,856 A | 8/1998 | Lillich | | 6,049,891 A * | 4/2000 | Inamoto ............................ 714/6 |
| 5,793,364 A | 8/1998 | Bolanos et al. | | 6,054,987 A | 4/2000 | Richardson |
| 5,793,980 A | 8/1998 | Glaser | | 6,055,573 A | 4/2000 | Gardenswartz et al. |
| 5,798,785 A | 8/1998 | Hendricks | | 6,057,874 A | 5/2000 | Michaud |
| 5,802,283 A * | 9/1998 | Grady et al. .................... 709/227 | | 6,069,672 A | 5/2000 | Claassen |
| 5,802,599 A | 9/1998 | Cabrera | | 6,072,982 A | 6/2000 | Haddad |
| 5,805,804 A | 9/1998 | Laursen et al. | | 6,107,937 A | 8/2000 | Hamada |
| 5,808,224 A | 9/1998 | Kato | | 6,118,450 A | 9/2000 | Proehl et al. |
| 5,809,246 A | 9/1998 | Goldman | | 6,124,804 A | 9/2000 | Kitao et al. |
| 5,812,643 A | 9/1998 | Schelberg et al. | | 6,131,088 A | 10/2000 | Hill |
| 5,815,146 A | 9/1998 | Youden et al. | | 6,131,121 A | 10/2000 | Mattaway et al. |
| 5,825,884 A | 10/1998 | Zdepski et al. | | 6,134,547 A | 10/2000 | Huxley et al. |
| 5,831,555 A | 11/1998 | Yu et al. | | 6,138,150 A | 10/2000 | Nichols et al. |

| | | |
|---|---|---|
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 * | 1/2001 | Nathan et al. ............... 725/134 |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 * | 2/2001 | Adams et al. ............... 711/156 |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,226,715 B1 * | 5/2001 | Van Der Wolf et al. ...... 711/133 |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 * | 10/2001 | Nathan et al. ............... 709/221 |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 * | 3/2002 | Edwards et al. ............... 707/696 |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 * | 8/2002 | Menzel ............... 711/156 |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 * | 9/2002 | Peters et al. ............... 711/112 |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 * | 3/2003 | Miller et al. ............... 709/217 |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 * | 6/2003 | Mastronardi et al. ...... 707/104.1 |
| 6,587,403 B1 | 7/2003 | Keller et al. |
| 6,590,838 B1 | 7/2003 | Gerlings et al. |
| 6,598,230 B1 * | 7/2003 | Ballhorn ............... 725/118 |
| 6,622,307 B1 | 9/2003 | Ho |
| 6,628,939 B2 | 9/2003 | Paulsen |
| 6,629,318 B1 * | 9/2003 | Radha et al. ............... 725/134 |
| 6,643,620 B1 * | 11/2003 | Contolini et al. ............... 704/270 |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 * | 4/2004 | Naruto et al. ............... 386/241 |
| 6,728,824 B1 * | 4/2004 | Chen ............... 711/1 |
| 6,728,956 B2 | 4/2004 | Ono |
| 6,728,966 B1 * | 4/2004 | Arsenault et al. ............... 725/39 |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 * | 8/2005 | Ellis et al. ............... 725/50 |
| 6,934,700 B1 * | 8/2005 | Ijdens et al. ............... 1/1 |
| 6,942,574 B1 | 9/2005 | LeMay et al. |
| 6,974,076 B1 | 12/2005 | Siegel |
| 7,024,485 B2 | 4/2006 | Dunning et al. |
| 7,103,583 B1 * | 9/2006 | Baum et al. ............... 705/409 |
| 7,107,109 B1 | 9/2006 | Nathan et al. |
| 7,111,129 B2 * | 9/2006 | Percival ............... 711/141 |
| 7,114,013 B2 * | 9/2006 | Bakke et al. ............... 710/5 |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 * | 4/2007 | Looney et al. ............... 84/615 |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |

| | | | | | | |
|---|---|---|---|---|---|---|
| 2003/0104865 A1 | 6/2003 | Itkis et al. | GB | A 2122799 | | 1/1984 |
| 2003/0108164 A1 | 6/2003 | Laurin et al. | GB | 2166328 | A | 4/1986 |
| 2003/0135424 A1 | 7/2003 | Davis et al. | GB | 2170943 | | 8/1986 |
| 2003/0208586 A1 | 11/2003 | Mastronardi et al. | GB | 2193420 | | 2/1988 |
| 2003/0225834 A1 | 12/2003 | Lee et al. | GB | 2 238680 | A | 6/1991 |
| 2004/0025185 A1 | 2/2004 | Goci et al. | GB | 2254469 | | 10/1992 |
| 2004/0085334 A1 | 5/2004 | Reaney | GB | 2259398 | | 3/1993 |
| 2004/0103150 A1 | 5/2004 | Ogdon et al. | GB | 2262170 | A | 6/1993 |
| 2004/0204220 A1 | 10/2004 | Fried et al. | GB | 2380377 | | 4/2003 |
| 2004/0220926 A1 | 11/2004 | Lamkin et al. | JP | 61-84143 | | 4/1986 |
| 2005/0060405 A1 | 3/2005 | Nathan et al. | JP | 5-122282 | | 5/1993 |
| 2005/0073782 A1 | 4/2005 | Nathan | JP | 8-274812 | | 10/1996 |
| 2005/0086172 A1 | 4/2005 | Stefik | JP | 9-114470 | | 5/1997 |
| 2005/0125833 A1 | 6/2005 | Nathan et al. | JP | 9-127964 | | 5/1997 |
| 2005/0267819 A1 | 12/2005 | Kaplan | WO | WO 86 01326 | A | 2/1986 |
| 2006/0018208 A1 | 1/2006 | Nathan et al. | WO | WO A 90 07843 | | 7/1990 |
| 2006/0035707 A1 | 2/2006 | Nguyen et al. | WO | WO 91/08542 | | 6/1991 |
| 2006/0062094 A1 | 3/2006 | Nathan et al. | WO | WO A 91 20082 | | 12/1991 |
| 2006/0239131 A1 | 10/2006 | Nathan et al. | WO | WO 93/16557 | | 8/1993 |
| 2006/0293773 A1 | 12/2006 | Nathan et al. | WO | WO A 93 18465 | | 9/1993 |
| 2007/0121430 A1 | 5/2007 | Nathan | WO | WO A 94 03894 | | 2/1994 |
| 2007/0142022 A1 | 6/2007 | Madonna et al. | WO | WO 94/14273 | | 6/1994 |
| 2007/0160224 A1 | 7/2007 | Nathan | WO | WO 94/15306 | | 7/1994 |
| 2007/0204263 A1 | 8/2007 | Nathan et al. | WO | WO 94 15416 | A | 7/1994 |
| 2007/0209053 A1 | 9/2007 | Nathan | WO | WO 95 03609 | A | 2/1995 |
| 2007/0247979 A1 | 10/2007 | Brillon et al. | WO | WO 95/29537 | | 11/1995 |
| 2008/0069545 A1 | 3/2008 | Nathan et al. | WO | WO 96/12255 | | 4/1996 |
| 2008/0077962 A1 | 3/2008 | Nathan | WO | WO 96/12256 | | 4/1996 |
| 2008/0086379 A1 | 4/2008 | Dion et al. | WO | WO 96/12257 | * | 4/1996 |
| 2008/0096659 A1 | 4/2008 | Kreloff et al. | WO | WO 96 12258 | A | 4/1996 |
| 2008/0137849 A1 | 6/2008 | Nathan | WO | WO 98/07940 | | 2/1998 |
| 2008/0168807 A1 | 7/2008 | Dion et al. | WO | WO 98/45835 | | 10/1998 |
| 2008/0171594 A1 | 7/2008 | Fedesna et al. | WO | WO 01/00290 | | 1/2001 |
| 2008/0195443 A1 | 8/2008 | Nathan et al. | WO | WO 01/08148 | | 2/2001 |
| 2008/0239887 A1 | 10/2008 | Tooker et al. | WO | WO 02/095752 | | 11/2002 |
| 2009/0037969 A1 | 2/2009 | Nathan | WO | WO 2006/014739 | | 2/2006 |
| 2009/0070341 A1 | 3/2009 | Mastronardi et al. | | | | |
| 2009/0138111 A1 | 5/2009 | Mastronardi | | | | |
| 2009/0265734 A1 | 10/2009 | Dion et al. | | | | |
| 2009/0282491 A1 | 11/2009 | Nathan | | | | |
| 2010/0042505 A1 | 2/2010 | Straus | | | | |
| 2010/0211818 A1 | 8/2010 | Nathan et al. | | | | |

FOREIGN PATENT DOCUMENTS

| | | |
|---|---|---|
| DE | 3406058 | 8/1985 |
| DE | 3815071 | 11/1989 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0309298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974 896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | A 2602352 | 2/1988 |
| FR | 2808906 | 11/2001 |

OTHER PUBLICATIONS

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

"High-speed Opens and Shorts Substrate Tester", IBM Technical Disclosure Bulletin, vol. 33, No. 12, May 1991, pp. 251-259.

"Darts Revolution Again", Replay Magazine, Mar. 1991, pp. 146-148.

Galen A. Grimes, "Chapter 18, Taking Advantage or Web-based Audio".

Petri Koskelainem "Report on Streamworks ™".

W. Richard Stevens, "TCP/IP Illustrated: vol. 1, the Protocols".

Nowell Outlaw "Virtual Servers Offer Performance benefits for Networks Imaging".

"Ecast Forges Landmark International Technology Partnership", Business Wire at www.findarticles.com/cf_0/m0EIN/2000_July_25/63663604/print.jhtml, 2 pages, Jul. 25, 2000.

Derfler, Frank J. et al., How Networks Work, Millennium Ed., Que Corporation, Jan. 2000.

Ecast Selects Viant to Build Siren Entertainment System (TM), ScreamingMedia, PR Newswire San Francisco, industry.java.sum.com/javanews/stories/story2/0,1072,17618,00.html, 3 pages, Aug. 3, 1999.

European Search Report from EP 1 993 079.

European Search Report issued for European Application No. 08000845.1-1238/1962251, dated Apr. 3, 2009.

Gralla, Preston, How the Internet Works, Millennium Ed., Que Corporation, Aug. 1999.

Hicks et al, "Dynamic software updating", ACM PLDI, pp. 13-23, 2001.

iTOUCH 27 New Games brochure, JVL Corporation, 2005, 2 pages.

iTouch 8 Plus brochure, JVL Corporation, 2005, 2 pages.

Kozierok, Charles M., The PC Guide, Site Version 2.2.0, http://www.pcguide.com, Apr. 17, 2001.

Liang et al, "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al, "A mediation infrastructure for digital library services", ACM DL, pp. 123-132, 2000.
Mod Box Internet brochure, Merit Entertainment, 2006, 2 pages.
Newsome et al, "Proxy compilation of dynamically loaded java classes with MoJo", ACM LCTES, pp. 204-212, 2002.
Schneier, Bruce, Applied Cryptography, Second Edition, John Wiley & Sons, Inc. New York, 1996.
Vortex Brochure, JVL Corporation, 2005, 2 pages.
Waingrow, Kirk, Unix Hints & Hacks, Que Corporation, Indianapolis, IN, 1999.
White, Ron, How Computers Work, Millennium Ed., Que Corporation, Indianapolis, IN, Sep. 1999 (Sep. 22, 1999).

* cited by examiner

DOWNLOADING FILE RECEPTION PROCESS

This application claims priority to French Application No. 00 01907 filed Feb. 16, 2000, the entire contents of which are hereby incorporated by reference.

FIELD OF THE INVENTION

The present invention relates to a file reception process applied to an audiovisual data reproduction system.

BACKGROUND OF THE INVENTION

In the prior art, file reception processes comprising a first step, wherein the file(s) received are stored in memory in a file located in a temporary storage area, are known. Then, a specific procedure checks whether the file(s) received correspond to the file(s) expected. If this is the case, according to the type of file, the files received are copied to a specified permanent storage area.

OBJECTS AND SUMMARY OF THE INVENTION

Therefore, the purpose of the present invention is to remedy the disadvantages of the prior art by proposing a file reception process no longer requiring temporary file storage.

This purpose is achieved by a process for receiving files sent by a central server to an audiovisual data reproduction system, managed by an operating system and linked to the server, by means of a data transfer link, characterised in that the process comprises:
 a step consisting of initialising a link between the central server and an audiovisual data reproduction system,
 a step consisting of storing files sent by the central server on storage means of the audiovisual data reproduction system, each file comprising specified information representative of the type of data contained in the file,
 a step consisting of searching, for each file received, a specific reception function, this search step being carried out by means of the specified information representative of the type of data contained in the file,
 a step consisting of processing each file by the corresponding reception function, the processing comprising copying of the file received to a specified storage area.

BRIEF DESCRIPTION OF DRAWINGS

The invention, with its characteristics and advantages, will be understood more clearly upon reading the description given with reference to the appended drawings, wherein.

DESCRIPTION OF THE PREFERRED EMBODIMENTS

The file reception process according to the invention is implemented by an audiovisual data reproduction system such as that described in the European patent application No. 99 401 785.3. According to this European patent application, the reproduction system essentially comprises a central processing unit managing, by means of a plurality of interfaces and an operating system, sound reproduction, image display, song selection and a link with a remote audiovisual data distribution server. The operating system is organised in hierarchical modules each managing a specific function of the audiovisual data reproduction system.

The operating system of such an audiovisual data reproduction system also manages a database. This database contains data on the files stored on the reproduction system's storage means. These files particularly represent, either digitised data forming songs, or graphic data representing the cover of the albums from which the songs are taken, or animations (video or advertising). For example, there are at least two types of graphic files. The first type of graphic file represents the album cover in a small format. This first type of graphic file is used during a customer's search in the list of songs available on the reproduction system. The second type of files represents the album cover in a large format. This second type of file is used when the customer has selected a song taken from the album corresponding to the cover. The third type of file may be a video, advertisement or survey. The different file types, song files, graphic files of the first and second types, are differentiated using a different file extension for each file type.

The data contained in the database is used to determine the links existing between the song files and the associated graphic files, such that all song files are linked to at least one graphic file. However, graphic files representing the album cover may not be linked to any song file. This means that the songs in the album represented by the cover are not stored on the reproduction system but may be ordered in order to be downloaded onto the reproduction system's storage means. Similarly, new songs with their corresponding album sleeve may be ordered in order to be downloaded onto the reproduction system's storage means. It is during the downloading of the files corresponding to the songs or album sleeves that the process according to the invention is implemented.

When new songs are ordered using an audiovisual data reproduction system, the operating system of the reproduction system checks whether, for the new song, a graphic file, representing the album cover, is already stored on the storage means. If this is not the case, the corresponding graphic file(s) is/are also ordered. For each file ordered, a function intended to process and handle the file ordered is created by a module of the operating system supervising the type of file ordered. In this way, the operating system comprises a first module managing song files, a second module managing the first type of graphic files, a third module managing the second type of graphic files and other modules managing the other file types. In the rest of this document, the operation will be described with three different file types. However, this does not represent a limitation of the present invention. In this way, during the order, for example of a specified song file, the first module creates a specific reception function for the song files ordered. To do this, the database comprises the name of all the files of all the songs available on the reproduction system and the name of all the files of all the downloadable songs. In this way, for each file ordered, the reception function is created.

Similarly, the first, second and third modules comprise a function creating a "standard" reception function used to account for the reception of a song file or a graphic file of the first or second type. In this way, even if a file, e.g. a song file, was not ordered directly by means of the reproduction system, but by other means such as, for example, the server or an Internet site connected to the server, the reception of this file may be taken into account by the reproduction system.

When the order of a file has been validated, a fourth module of the operating system handles the management of the link with the remote server. For this, as soon as a communication is connected with the server, the fourth module creates a specific file comprising the identification of all the files ordered on the reproduction system. After the server checks any rights authorising the downloading of files onto the reproduction system or not, the requested files are sent to the requesting reproduction system. The files are sent in data packets.

Figure 1:
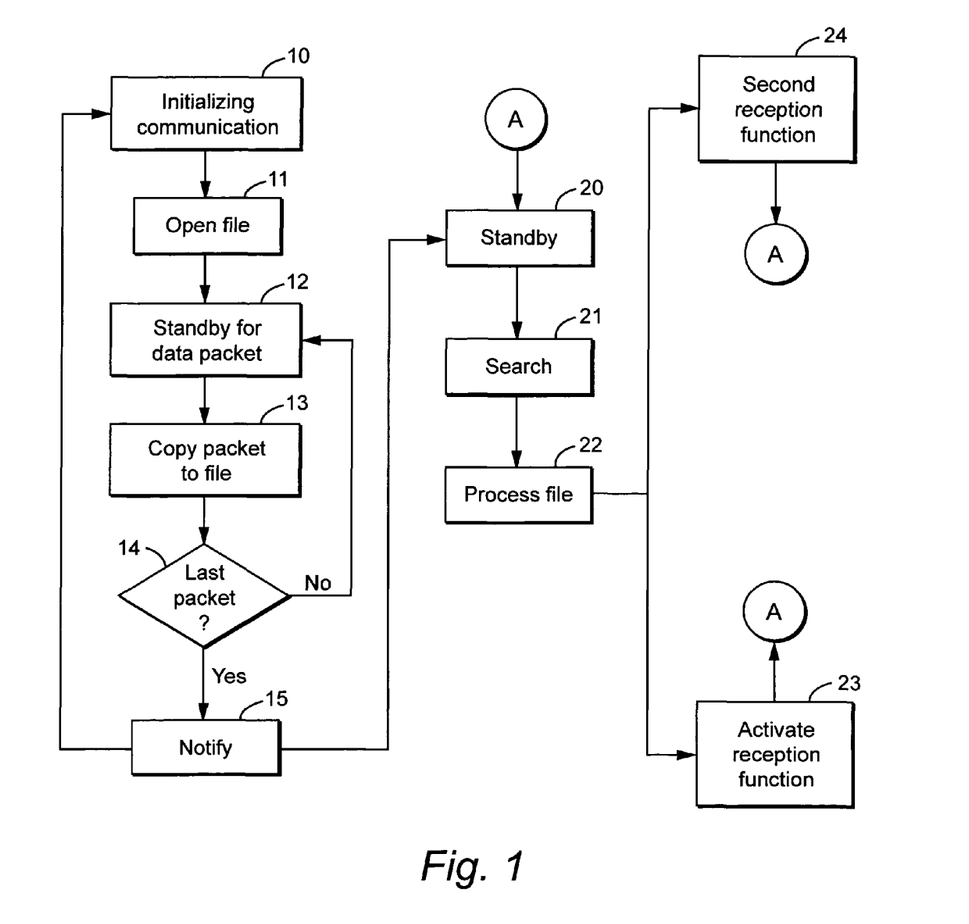
FIG. 1 represents a logic diagram of the file reception process according to the invention.

FIG. 1 represents a logic diagram of the file reception process according to the invention. In the process according to the invention, a first step 10 consists of initialising the communication between the server and the reproduction system to perform the file transfer. Then, the process comprises a step 11 consisting of opening a reception file on the storage means. According to the invention, the storage area selected is a permanent storage area wherein the memory available has a specified minimum size. In this way, unlike the prior art, the data is not stored in a specific temporary storage area, but in any area of the storage means, provided that this area has a specified minimum size. After the file has been opened, during a third step 12, a "telecommunication" module of the operating system, is set to standby for a data packet.

Then, during a reception step 13, the data contained in the packet received is copied to the open file. A checking step 14 checks whether the packet that has just been copied is the last packet of the file being received. As long as the last packet of the file being received has not been received, all the data packets of the same file are copied to the previously opened file. When the last data packet of the file is detected during the checking step 14, the operating system telecommunication module creates, during a sixth step 15, a notification that it then sends to the fourth module managing the link with the server. This notification informs the fourth module that a new file has been received. As soon as this notification is received, the fourth module switches from a standby step 20 to a search step 21 in all the reception functions created, to find whether any of them relate to the file received. Similarly, the fourth module also searches to find whether a standard reception function exists.

The search is carried out by means of the name of the file received and/or by means of its extension. Indeed, each reception function is specific, either to a specific file or to a file type. Consequently, using the name or extension of the file received, the associated reception function can easily be located by the fourth module. When the fourth module locates the function corresponding to the file received, it is then activated during a ninth step 22 to start the processing of this new file. For each file related to a song, a first reception function is activated during a tenth step 24, and for each file related to an image, a second reception function is activated during an eleventh step 23. The processing of a song file or image file essentially consists of copying the file received to an appropriate memory area and then updating the reproduction system's database. If no reception function is located by the fourth module of the reproduction system, the process is stopped and no other action or operation is carried out on the file received.

Figure 2:
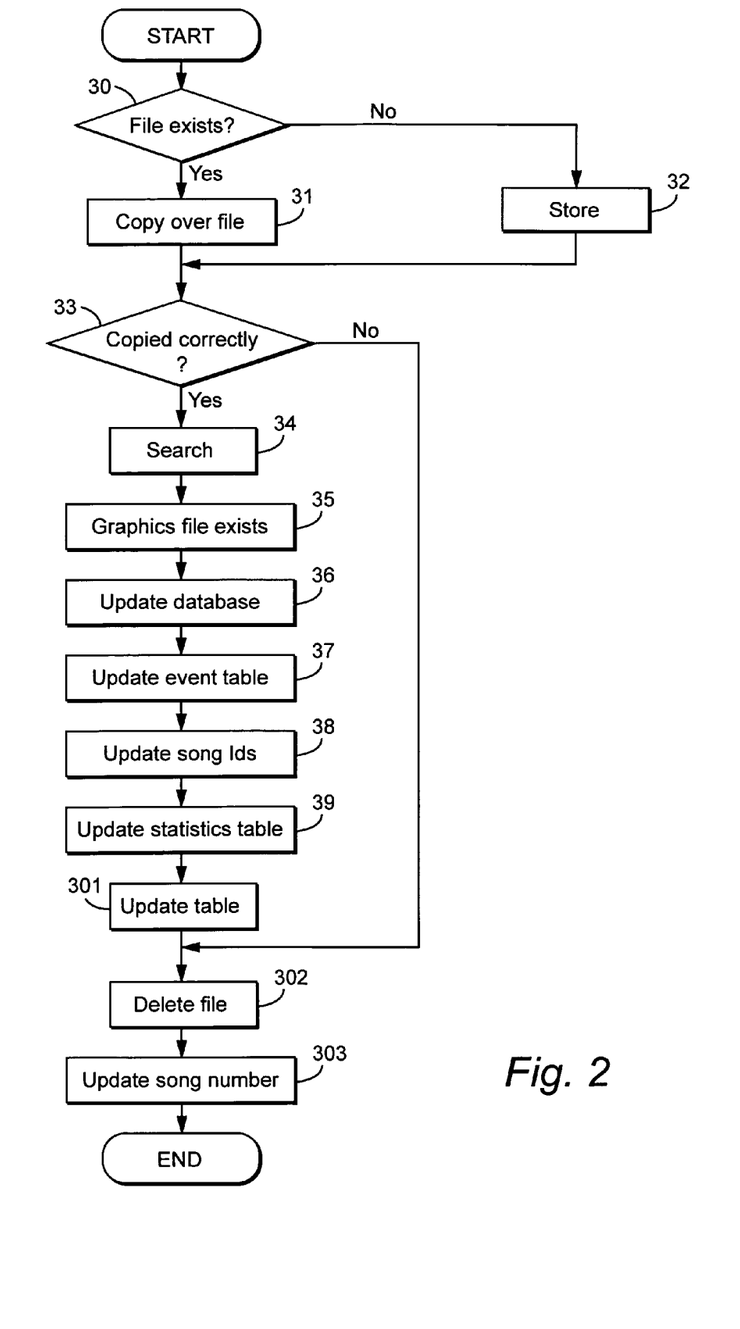
FIG. 2 represents a logic diagram of a representative song file reception function.

FIG. 2 represents the logic diagram of a representative song file reception function. In a first step 30, the reception function checks in the reproduction system's database whether the file already exists. If it exists, the new file is copied over the old one in a second step 31, such that the old file is deleted, if the file does not exist, the new file is stored in memory, in a third step 32, to an appropriate area of the storage means, e.g. to a specific directory. Then, the function checks, in a fourth step 33, whether the new file was copied correctly. If this is not the case, the function, in a fifth step 302, deletes the file received. If the new file was copied correctly, the reception function updates the database. This update comprises, in a sixth step 34, a search in the file received, for the data to update the database. Then, using the data found, the reception function checks, in a seventh step 35, that the associated graphic files exist. Similarly, the reception function checks whether the versions of the song file and associated graphic files are compatible with each other and with the operating system version. Otherwise, the operating system is not updated or the new graphic files are ordered, for example, according to the process described in the European patent request No. 99 401 785.3.

Then, in an eighth step 36, the reception function updates the database to account for the associated graphic files. In a ninth step 37, the reception function adds to an event table in the reproduction system's database that a new song file has been received.

In a tenth step 38, the reception function updates a file stored on the reproduction system, comprising the identification of all the songs available on the reproduction system. Each song is, for example, identified by means of a single number. This file is used by the server to detect the list of songs available on each reproduction system connected to the server. In this way, the server can detect the list of songs present on the reproduction system by requesting, during a communication with the reproduction system, the latter to send the file containing the list of songs. In this way, the server simply needs to extract the song numbers contained in this file to find out the songs available on the reproduction system.

In an eleventh step 39, the reception function adds an entry to a statistics table in the reproduction system's database. This statistics table makes it possible to determine how many times the song corresponding to the new file received is selected. In a twelfth step 301, the reception function updates a purchase table in the reproduction system's database. This purchase table is used, for example, to check that the number of songs ordered is less than a specified number or to bill the songs ordered. Then, the reception function carries out the fifth step 302 consisting of deleting the file received at its original location. Indeed, the file received in the second 31 or third step 32 is copied to a specified memory area. Consequently, the file received is kept in its initial location throughout the database update steps. After this update, the initial version is of no further use and, consequently, may be deleted. The reception function ends with a thirteenth step 303 consisting of updating the number of songs that can be selected by a customer on the reproduction system. This number is stored in memory on the system storage means to be compared to a specified threshold. When the number is equal to the threshold, this means that the reproduction system comprises a maximum number of songs that can be selected and that it is therefore not possible to order others without deleting at least one song beforehand.

Figure 3:
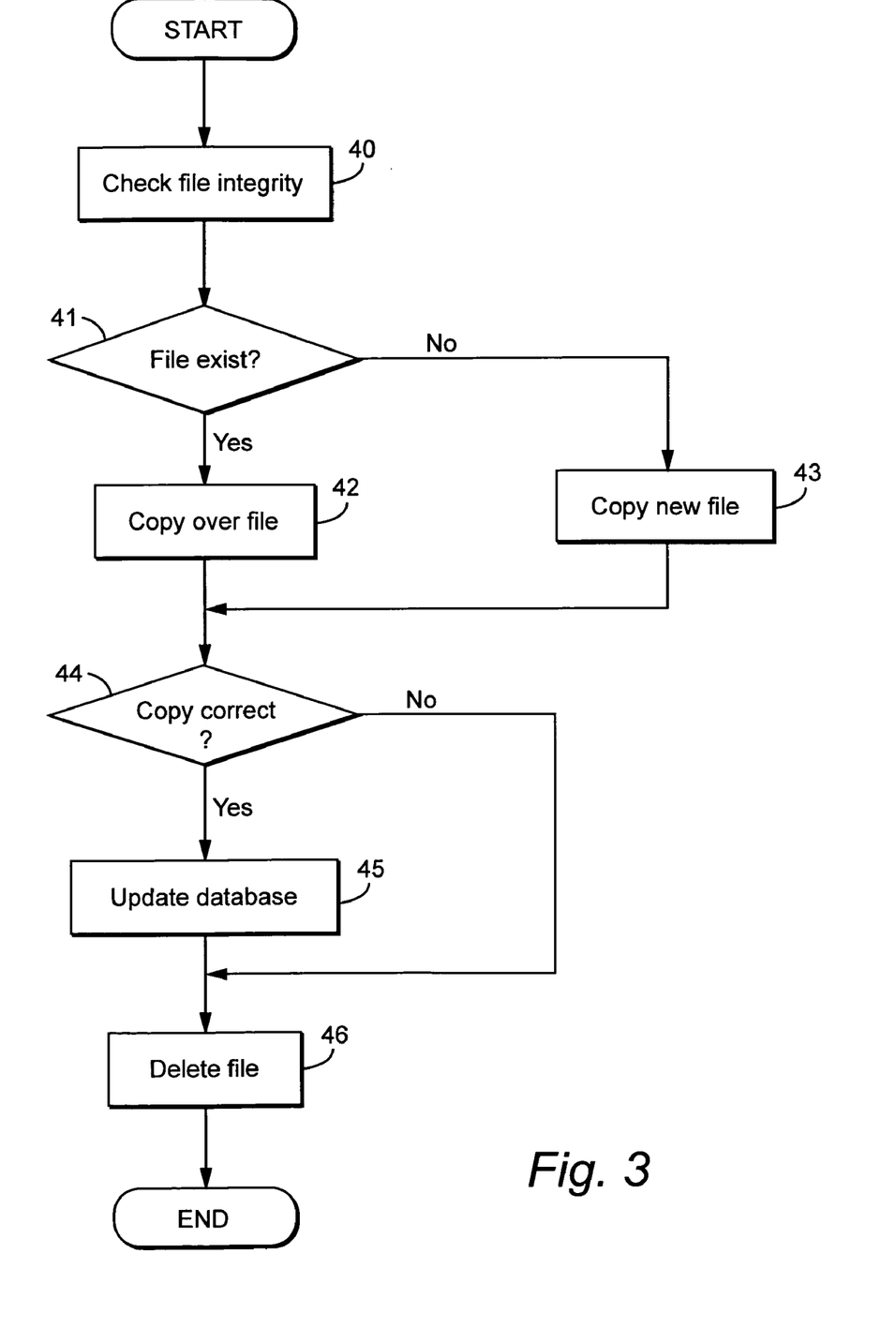
FIG. 3 represents a logic diagram of a representative album cover file reception function.

FIG. 3 represents the logic diagram of a representative album cover file reception function. According to the invention, the processing of graphic files of the first and second types is identical. The graphic file reception function checks, in a first step 40, the integrity of the file received. In a second step 41, the reception function checks in the reproduction system's database whether the graphic file already exists. If it exists, the new file is copied, during a third step 42, over the old file, such that the old file is deleted. If the file does not exist, the new graphic file is copied, during a fourth step 43, in an appropriate area of the storage means, e.g. to a specific directory. Then, the function checks, to a fifth step 44, whether the new file was copied correctly. If this is not the case, the function, in a sixth step 46, deletes the file received. If the new file was copied correctly, the reception function, in a seventh step 45, updates the database. This update consists of indicating the name of the new graphic file, and the songs to which it is linked, i.e. the songs belonging to the album represented by the graphic file. All this data is either available in the graphic file or available in an archive table in the database.

In this way, the file reception process according to the invention is characterised in that it comprises:
- a step consisting of initialising a link between the central server and an audiovisual data reproduction system,
- a step consisting of storing files sent by the central server on storage means of the audiovisual data reproduction system, each file comprising specified information representative of the type of data contained in the file,
- a step consisting of searching, for each file received, a specific reception function, this search step being carried out by means of the specified information representative of the type of data contained in the file,
- a step consisting of processing each file by the corresponding reception function, the processing comprising copying of the file received to a specified storage area.

In another embodiment, the storage step consists of opening a file in any permanent memory area with an available area of a specified minimum value, to write the data sent.

In another embodiment, the processing step comprises the update of a database of the audiovisual data reproduction system to account for the data contained in the file received.

In another embodiment, the search step is activated when the last data packet corresponding to a whole file is stored in memory.

In another embodiment, the specified information comprises the file extension and/or the name of the file received.

In another embodiment, when the specified information represents a song file, the database update step comprises at least one of the following steps:
- a step consisting of checking the compatibility of the version of the song file with the version of the reproduction system operating system,
- a step consisting of updating a file stored on the reproduction system containing the identification of all the songs stored on the reproduction system,
- a step consisting of updating a statistics table in the database making it possible to determine the selection frequency of the song corresponding to the file stored in memory,
- a step consisting of updating a purchase table containing the number and name of all the songs purchased for the reproduction system,
- a step consisting of updating a counter of songs that can be selected to check that the number of songs that can be selected is not greater than a specified threshold.

It must be clear for those experienced in the art that the present invention enables embodiments in many other specific forms without leaving the field of the invention as claimed. Consequently, the present embodiments must be considered as illustrations, but may be modified in the field defined by the scope of the claims attached, and the invention must not be limited to the details given above.

The invention claimed is:

1. A method for receiving files sent by a central server to an audiovisual data reproduction system managed by an operating system and linked to the server using a data transfer link, the method comprising:
   initializing a link between the central server and an audiovisual data reproduction system,
   selecting an available storage area of a specified minimum size,
   opening a reception file on a first permanent storage means of said audiovisual data reproduction system, corresponding to the available storage area selected,
   receiving each packet of said file sent by the central server and directly writing each said packet sent by the central server to said reception file, each file having information representative of a type of data associated with the file,
   for each file received, searching for a reception function to be associated with each received file based at least in part on the information representative of the type of data associated with the file, and
   processing each received file by the corresponding reception function, the processing comprising copying the received file to a second storage means to update a database of the audiovisual reproduction system according to the data included in the received file,
   wherein the minimum size corresponds to a size of the file sent by the central server.

2. The method of claim 1, further comprising performing said searching when the last data packet of the file is stored in the second storage means.

3. The method of claim 1, wherein the information representative of the type of data comprises the file extension and/or the name of the file received.

4. The method of claim 1, wherein when the information representative of the type of data represents a song file, the database update step comprises at least one of the following steps:
   associating the received song file with a graphical file stored in the audiovisual reproduction system,
   checking the compatibility of the version of the song file with a version of an operating system of the audiovisual data reproduction system,
   updating a file stored on the audiovisual data reproduction system that identifies all songs stored on the audiovisual data reproduction system,
   updating a statistics table in the database making it possible to determine a selection frequency of the song corresponding to the file stored in memory,
   updating a purchase table containing the number and name of all the songs purchased for the audiovisual data reproduction system, and
   updating a counter of songs that can be selected to check that the number of songs that can be selected is not greater than a specified threshold.

5. The method of claim 1, further comprising when said searching does match a received file to a reception function, storing the received file in the first storage means.

* * * * *